Aug. 7, 1956   G. A. LYON   2,757,984
WHEEL COVER
Filed March 27, 1953
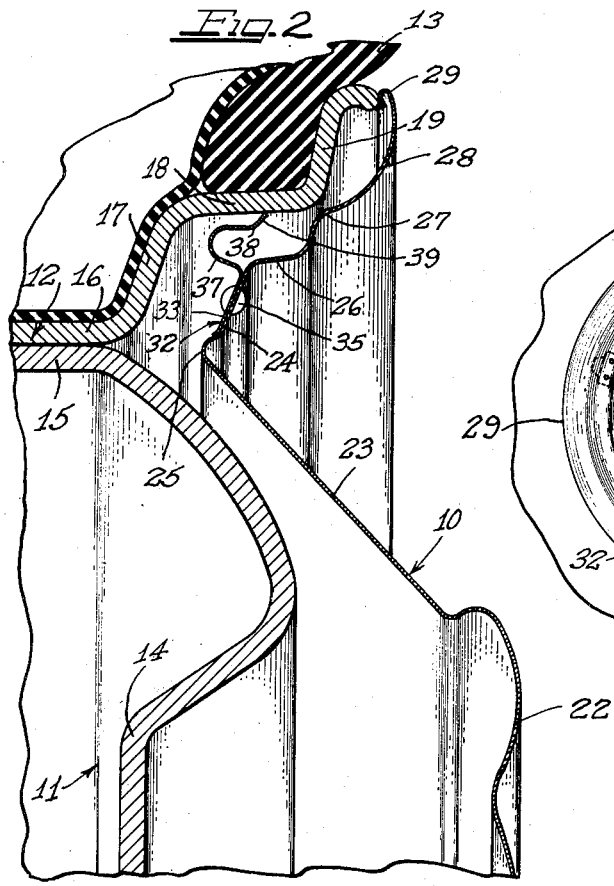
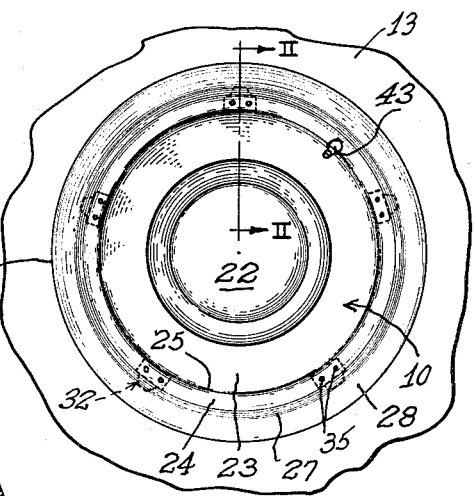
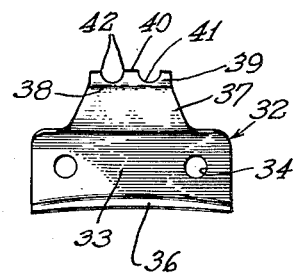
Inventor
GEORGE ALBERT LYON
by Hill, Sherman, Meroni, Gross & Simpson   Attys.

United States Patent Office 2,757,984
Patented Aug. 7, 1956

2,757,984

WHEEL COVER

George Albert Lyon, Detroit, Mich.

Application March 27, 1953, Serial No. 345,197

3 Claims. (Cl. 301—37)

The present invention relates to improvements in wheel structures, and more particularly concerns the provision of improved ornamental and protective cover means for the outer sides of vehicle wheels.

An important object of the present invention is to provide a wheel structure including improved cover means for the outer side of the wheel.

Another object of the invention is to provide in a wheel structure a cover including novel means for the self-retention of the cover upon the outer side of the wheel.

A further object of the invention is to provide an improved wheel cover having novel self-retaining means efficiently engageable with the tire rim of a vehicle wheel under conditions of limited clearance.

Still another object of the invention is to provide an improved retaining clip structure for covers of the easy-on, hard-off type.

Other objects, features and advantages of the present invention will be apparent from the following detailed description of certain preferred embodiments thereof taken in conjunction with the accompanying drawings in which:

Figure 1 is a front elevational view of a vehicle wheel structure embodying the features of the present invention;

Figure 2 is an enlarged radial section taken substantially on the line II—II of Figure 1; and Figure 3 is a rear elevational view of one of the cover retaining finger clip members shown in Figs. 1 and 2.

A cover 10 (Figs. 1 and 2) embodying features of the present invention is adapted to be applied to the outer side of a vehicle wheel including a wheel body 11 and a tire rim 12, the latter being of the multi-flange, drop-center type adapted for supporting a pneumatic tire and tube assembly 13.

The wheel body 11 is preferably of the disk spider type and comprises a stamping made from a suitable heavy gauge sheet metal and having a central bolt-on flange 14 and an outer peripheral axially inwardly extending attachment flange 15.

The tire rim 12 comprises a base flange 16 secured to the attachment flange 15 on the wheel body, and a generally radially and slightly axially outwardly extending side flange 17. Directed generally axially outwardly and slightly radially oblique from the side flange 17 is an intermediate flange 18 which merges with a terminal flange 19.

In a preferred form, the cover 10 may be formed from suitable thin gauge sheet material, such as stainless steel, or brass or the like, and comprises a central crown portion 22 disposed in assembly with the wheel in axially outwardly spaced overlying relation to the wheel body flange 14 and having a radially outwardly and axially inwardly extending generally frusto-conically shaped side wall portion 23 directed toward the juncture of the wheel body and the tire rim.

Joined to the radially outer extremity of the side wall portion 23 and overlying the rim side flange 17 is an intermediate generally radially outwardly and axially outwardly oblique portion 24 lying in assembly with the wheel in limited spaced relation to the side flange 17 of the tire rim. For reinforcing purposes, the juncture of the side wall 23 and the intermediate portion 24 is preferably formed with an annular inwardly directed rib 25.

From the outer margin of the portion 24, the cover member has projecting generally axially outwardly a wall portion 26 which merges with an annular generally axially inwardly directed annular rib like portion providing a pry-off shoulder 27 adjacent the juncture shoulder between the intermediate and terminal flanges 18 and 19. Extending radially and axially outwardly from the pry-off shoulder 27 is a dished annular marginal portion 28 which is spaced axially outwardly from the tire rim. The marginal portion 28 terminates in an underturned outer peripheral flange 29 which is adapted to seat against the outer edge of the rim terminal flange 19.

According to the present invention, the cover member 10 of the wheel structure is provided with self-retention means engageable with the vehicle wheel under conditions of limited clearance between the cover member and the wheel. For this purpose, the cover 10 is provided with a plurality of self-retention spring clips or retaining fingers 32 which are attached to the inner side of the cover member and disposed for gripping engagement with the tire rim.

As best illustrated in Figures 2 and 3, each of the clips 32 comprises a base flange or leg 33 of substantial width provided with a pair of transversely spaced rivet holes 34 for attaching the spring clip to the inner side of the intermediate portion 24 of the cover by means such as rivets 35. For properly seating the clip with relation to the rib 25, the radially inner marginal edge of the base flange 33 is provided with a tail portion 36 formed on a radius to conformably fit against the curved radially outer side of the rib 25.

Directed generally axially inwardly and radially outwardly from the outer margin of the base flange 33 of the spring clip is a generally U-shaped resilient finger loop portion 37 which comprises an integral extension in one piece from the base flange 33. For resilient flexibility the loop 37 is of substantially greater width at its juncture with the base flange 33 than at its free terminal portion.

The generally U-shaped loop 37 extends generally axially inwardly and radially outwardly at its inner leg portion and then curves at the bight of the loop in a reverse direction generally radially outwardly and axially outwardly. An arcuately curved shoulder flange portion 38 serves to substantially stiffen the free end portion of the finger loop 37, and forms the root of a short and relatively stiff rim flange-gripping, retaining terminal flange portion 39.

It will be observed that the retaining terminal 39 of the spring clip terminates in a gripping edge 40 which is preferably formed on an arc conforming to the inner surface of the intermediate flange 18. Prior to the application of the cover to the wheel, the terminal edges 40 of the retaining fingers 32 extend to a diameter somewhat greater than the inside diameter of at least the intermediate portion of the intermediate flange 18 of the tire rim.

In applying the cover 10 to the wheel, the cover is generally centered with respect to the wheel with the outer portion of the gripping terminal portions of the fingers cammingly engaging the radially outer margin of the intermediate flange 18 at or adjacent to its shoulder juncture with the terminal flange 19. Axially inward pressure is then applied to the cover, which causes the retaining finger terminal portions 39 to cam inwardly along the inner frusto-conical face of the intermediate flange 18. Thereby, the finger terminal portions are forced progressively radially inwardly, and, since the terminal portions are relatively short and stiff and are reinforced by the reinforcing flange portions 38, the radial inward pressure is reflected in resilient inward flexure of the looped finger portions 37 and progressive tensioning thereof, effecting firm radially outward rim gripping thrust of the terminal edges 40.

In this manner, the wheel cover 10 is effectively retained on the wheel since the inherent resiliency of the spring fingers forces the gripping edges 40 of the retaining terminals 39 to engage with said strong frictional wedging gripping action against the intermediate flange of the tire rim that substantial force is required to displace the cover.

For avoiding relative turning of the wheel cover on the wheel, such as might occur in the rotation of the wheel structure under sudden stopping or starting conditions, and angular displacement relative to a valve stem 43, suitable turn prevention means are provided. To this end, each of the terminal flange portions 39 of the spring clips 32 is provided with one or more notches 41 extending a short distance into the retaining flange short of the shoulder flange portion 38. This results in a plurality of edge sharp corners 42 on the retaining edge 40 of each spring clip, which corners, in effect, afford a multiplicity of torque resisting anchorage points in biting, gripping engagement with the inner surface of the intermediate flange 18.

As best seen in Figure 1, symmetrical retention of the fingers is assured by having the fingers located in equally spaced pattern about the cover, five fingers being shown in the illustrated embodiment, although a larger or smaller number of fingers may be used depending on size and service requirements.

Removal of the cover from the wheel is readily accomplished by means of a pry-off tool (not shown), such as a screw driver, inserted between the reinforcing flange or bead 29 of the wheel cover and the terminal tip of the terminal flange 19 of the rim, and the application of a pry-off leverage to the margin of the cover. This forces the cover axially outwardly away from the wheel and allows the pry-off tool to be advantageously inserted behind the wheel cover for the application of additional pry-off pressure against the annular secondary pry-off rib 27. This operation may be duplicated at suitable intervals around the periphery of the wheel until the gripping tension on the retaining fingers against the intermediate flange of the tire rim is relieved and the cover comes off.

To facilitate removing the cover from the wheel, the pry-off force should be applied as close to the retaining fingers 32 as possible. To this end, the heads of the rivets 35 securing the retaining fingers to the cover member afford visible indicia means, as illustrated in Figure 1, for positioning the pry-off tool in radial alignment with the retaining fingers 32.

It will be understood that modifications and variations may be effected without departing from the scope of the novel concepts of the present invention.

I claim as my invention:

1. In a wheel structure including a tire rim having a side flange facing generally axially outwardly and an intermediate flange projecting generally axially and radially outwardly therefrom and facing radially inwardly, a cover for disposition at the outer side of the wheel including a portion to lie in substantially concentric radially inwardly spaced relation from said intermediate flange and providing a surface area facing generally toward and in spaced relation to said side flange, said surface area having secured thereon base flanges of a series of circumferentially spaced resilient retaining fingers extending generally radially therefrom and having generally axially bent U-shaped portions with generally axially outwardly extending retaining finger legs spaced radially outwardly from said cover portion and spaced radially inwardly from the intermediate flange and radially resiliently deflectable relative to both the cover and the intermediate flange, said legs having short and stiff radially and axially outwardly angled retaining terminals engageable at their tips in retaining gripping press-on, pry-off relation with said intermediate flange, the terminal tips normally lying to a greater diameter than the diameter of the engageable portion of the intermediate flange and thereby being radially inwardly deflected by the retaining engagement with the intermediate flange and thus placing said legs under resilient radially inwardly deflected tension, said cover portion and said retaining fingers being disposed in assembly in confronting relation to the side flange of the tire rim.

2. In a wheel structure as defined in claim 1, each of said retaining finger base flanges being of substantial width confronting said cover portion surface area in face-to-face relation, with rivets securing said base flanges to the cover portion surface area.

3. In a wheel structure including a tire rim having a generally radially inwardly facing and axially extending annular intermediate flange extending from a generally axially outwardly facing and radially inwardly directed side flange, a cover disposed at the outer side of the wheel including an annular portion overlying the tire rim and having a generally axially inwardly and radially inwardly directed circular part for spaced disposition opposite the side and intermediate flanges of the tire rim, and retaining spring clips carried by said circular cover part and each provided with a base flange attached in confronting relation to the radially inwardly directed portion of said cover part and a generally U-shaped resilient finger loop portion as an integral extension in one piece from the base flange and extending generally axially inwardly and radially outwardly and then curving in the bight of the loop in a reverse direction to provide a resilient leg extending generally axially outwardly and being radially deflectable in the space between the generally axially inwardly directed portion of the cover part and said intermediate flange and having at its axially outer extremity a generally radially outwardly angled terminal having an edge terminus retainingly engageable in gripping retaining relation against the intermediate flange in press-on pry-off relation with the leg radially inwardly tensioned towards said cover part.

References Cited in the file of this patent

UNITED STATES PATENTS

| 1,800,173 | Anderson | Apr. 7, 1931 |
| 2,135,758 | Lyon | Nov. 8, 1938 |
| 2,193,104 | Lyon | Mar. 12, 1940 |
| 2,368,246 | Lyon | Jan. 30, 1945 |
| 2,522,024 | Englehart | Sept. 12, 1950 |
| 2,544,705 | Lyon | Mar. 13, 1951 |

FOREIGN PATENTS

| 449,040 | Great Britain | June 19, 1936 |